United States Patent Office 3,275,695
Patented Sept. 27, 1966

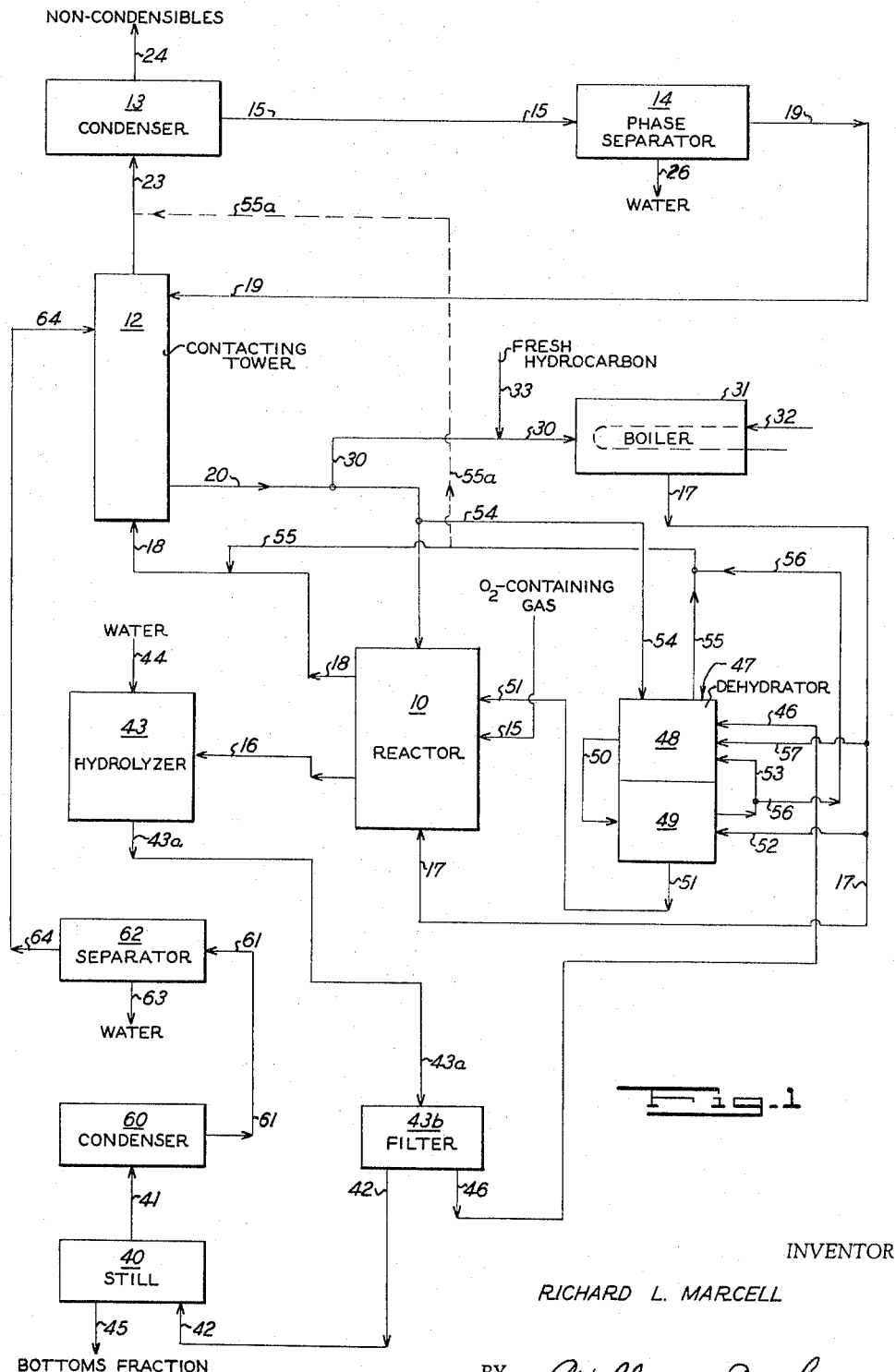

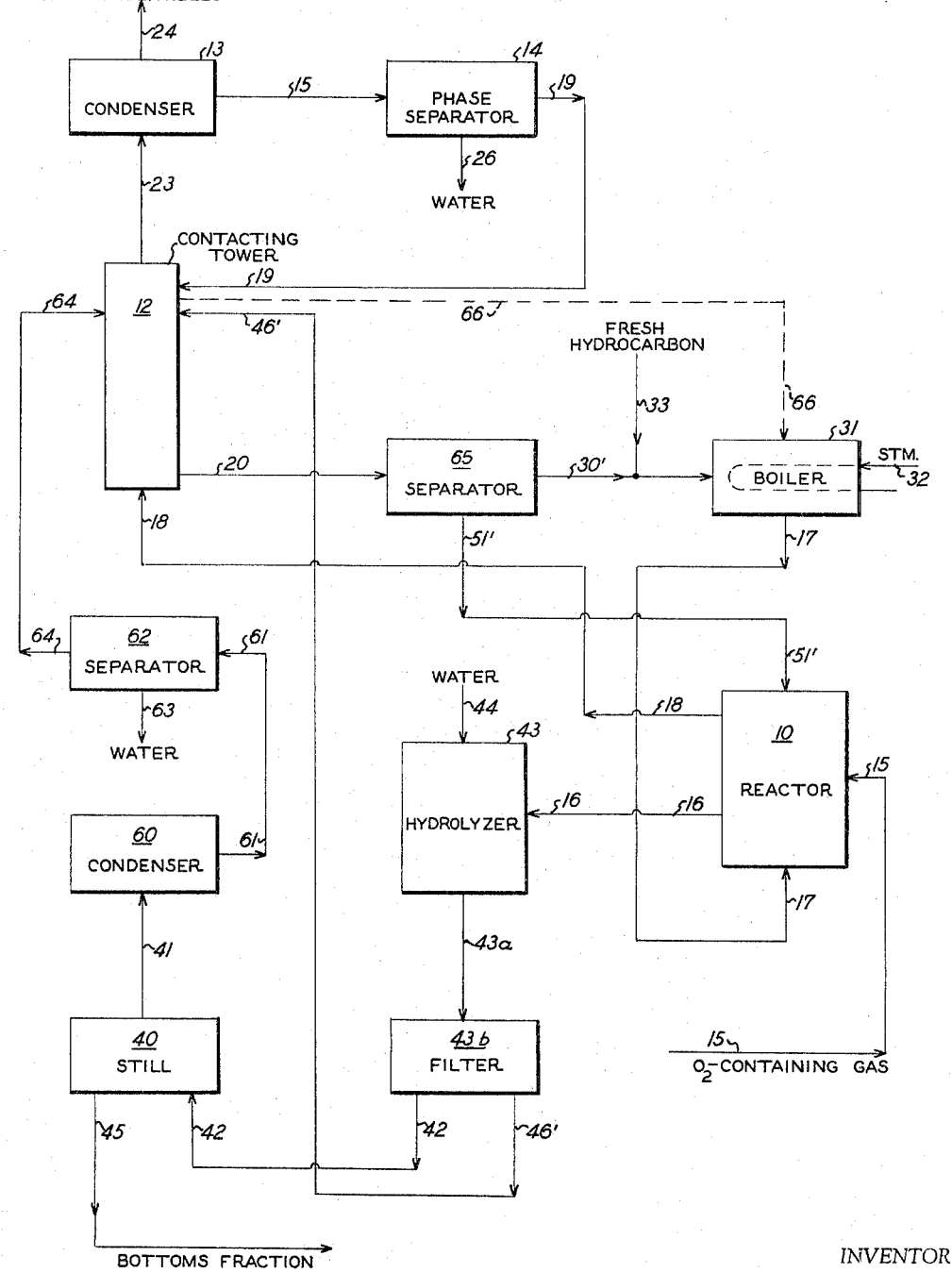

3,275,695
RECOVERY OF BORIC ACID FOR REUSE IN THE OXIDATION OF HYDROCARBONS
Richard L. Marcell, Bergenfield, N.J., assignor to Halcon International Inc., a corporation of Delaware
Filed Dec. 19, 1962, Ser. No. 245,858
4 Claims. (Cl. 260—631)

This application is a continuation-in-part of copending application Serial Number 170,607, filed February 1, 1962, now abandoned.

This invention relates to processes for the liquid phase partial oxidation of hydrocarbons with a molecular oxygen containing gas, more particularly to such processes carried out in the presence of a lower hydrate of ortho-boric acid and especially to such a process wherein the boron compound is recovered from the reaction mixture as ortho-boric acid and this is continuously dehydrated to meta boric acid which is recycled to the oxidation reaction step.

Processes for the liquid phase partial oxidation of the hydrocarbons in the presence of a borate-ester forming material are commercially interesting. At the termination of the oxidation reaction, the reaction mixture contains a substantial amount of alcohol in the form of a borate ester thereof. In order to recover the alcohol as such it is desirable to subject the oxidation reaction mixture to a hydrolysis whereby the alcohol liberated can readily be recovered by distillation, solvent extraction, or the like. The hydrolysis is readily accomplished for example, by adding water to the oxidation reaction mixture after hydrocarbon removal and heating e.g., to 50–150° C.

The boric acid residue is recovered from the reaction mixture as solid ortho-boric acid mixed with hydrocarbon and water, and preferably it is dehydrated to anhydrous meta boric acid before re-use. Continuous azeotropic dehydration thereof requires a large boil-up of hydrocarbon.

The art is confronted with the problem of providing a more efficient dehydration process which minimizes or avoids these disadvantages.

The discoveries associated with the invention and relating to the solution of the above problems, and the objects achieved in accordance with the invention as set forth herein include the provision of:

A process for the liquid phase partial oxidation of hydrocarbons with a molecular oxygen containing gas in the presence of a lower boric acid hydrate whereby the reaction mixture is worked up to recover unreacted hydrocarbon and oxidation products including alcohols and the boron compound residue is recovered as ortho-boric acid which is recycled to the oxidation reaction step including the improvement of continuously dehydrating the ortho-boric acid in two stages to meta-boric acid then recycling the latter to the oxidation reaction step;

Such a process wherein the dehydration is in the presence of the hydrocarbon used in the oxidation step;

Such a process wherein the first stage is conducted at a temperature of 160° C. to remove free water and the second stage is conducted at a temperature of 160° C. to remove bound water;

Such a process wherein the vapor from the second stage is used to remove free water in the first stage;

Such a process wherein the hydrocarbon is a cycloalkane;

Such a process wherein the cycloalkane is cyclohexane;

Such a process wherein the dehydration is carried out together with drying cyclohexane containing some water;

Such a process wherein the hydrocarbon is reacted with molecular oxygen containing gas in the presence of an acidic boron compound;

Such a process wherein the boron compound is meta boric acid;

and other objects which will be apparent as details or embodiments of the invention are set forth hereinafter.

The accompanying drawing is a schematic flow diagram of one embodiment of the invention.

In order to indicate still more fully the nature of the present invention, the following examples of typical procedures are set forth in which parts and percent means parts and percents by weights, respectively, unless otherwise indicated, it being understood that these examples are presented as illustrative only and they are not intended to limit the scope of the invention.

*Example 1*

Referring to FIGURE 1 of the drawing, the batch oxidation reactor 10, which is charged with 308 parts of meta boric acid and 2711 parts of cyclohexane, is maintained at a temperature of about 330° F. and a pressure of 120 p.s.i. Air is introduced into the reactor 10 through line 15 and about 77 parts of $O_2$ absorbed. About 8% of the cyclohexane reacts and the liquid reaction mixture is withdrawn through line 16.

The reaction mixture is passed into hydrolyzer 43 via line 16, and water is introduced via line 44. The mixture is hydrolyzed, and passed via line 43a to filter 43b, wherein solid ortho-boric acid (with water and organics) is separated.

The oil or filtrate is passed via line 42 to still 40 wherein a cyclohexanol fraction is separated as bottoms fraction, and removed via line 45. The hydrocarbon vapor is passed via line 41 to condenser 60, wherein it is condensed, and passed via line 61 to separator 62. Water is separated and removed via line 63. Liquid hydrocarbon is passed via line 64 to tower 12.

The solid (or slurry with added hydrocarbon) is passed via line 46 into the first section or stage 48 of dehydrator 47 wherein free water is vaporized therefrom. Heat is supplied thereto via hydrocarbon vapor introduced via line 57. Hot liquid hydrocarbon is introduced thereinto via line 54, and hydrocarbon and water vapors are removed via line 55 and passed via line 18 to tower 12 (described below). The temperature is maintained at about 160° C. The resulting hydrocarbon boron compound mixture which contains essentially no free water is passed via line 50 to the second section or stage 49 of dehydrator 47, wherein the ortho-boric acid is dehydrated to meta-boric acid at about 160° C. Heat is supplied thereto by hydrocarbon vapors introduced via line 52. The vaporized hydrocarbon and water mixture is removed via line 53 and it may be passed via line 56 into line 55 and then processed as described above. Preferably, however, the vapors are passed via line 53 into the first section 48 in order to supply heat thereto. Any desired system that permits the two-stage dehydration may be used.

In another alternate, the vapors may be passed via line 55 and 55a to line 23 and then condenser 13, and processed as described below.

The resulting slurry of meta boric acid in hydrocarbon is passed via line 51 back to the reactor 10.

Preferably, heat is introduced into the reactor 10 by means of hydrocarbon vapor supplied by line 17. This vapor is produced in heater 31 by means of steam introduced therein via line 32. Hydrocarbon is introduced into the heat 31 as fresh material, via line 33 or as recycled material from lines 20 or 30. The amount of hydrocarbon vapor is sufficient to maintain the reaction mixture at the temperature desired, as well as provide the desired boil-up, and also may provide heat to tower 12.

In this way, efficient heat transfer is achieved without caking or coating on heat transfer surfaces. Where this is not desired, an indirect heater such as steam coil or jacket may be used in contact with the reaction mixture. The reaction mixture may be in the form of a slurry, some of the inorganic material being present as a solid.

In tower, 12, the "wet" or "watery" hydrocarbon is heated and water is removed as vapor with some hydrocarbon, the vapor passed via line 23 is condensed in condenser 13 (non-condensibles removed via line 24) and the liquid passed via line 15 to separator 14 wherein a lower water layer is separated, and removed via line 26. The upper "wet" hydrocarbon is passed via line 19 to tower 12. Dry hydrocarbon is removed from tower 12 via line 20, and passed to the reactor 10, or to line 30 and boiler 31, or both.

*Comparative Example A*

The above procedure is repeated except the dehydration is in a single stage or section. A 71% to an 87% higher proportion of vapor or boil-up is needed, e.g., for 1870 lbs. of ortho-boric acid with 19180 lbs. of cyclohexane and 500 lbs. of free water dehydrated at 160° C. for this example, as compared to that for Example 1.

This clearly demonstrates the very high efficiency obtained in accordance with the invention.

*Example 2*

The procedure of Example 1 is repeated except that the oxidation is conducted in a continuous manner, the amount of fresh hydrocarbon feed is sufficient to maintain a substantially constant level in the reactor, with continuous draw-off of some liquid reaction mixture via line 16. Similar results are obtained.

*Example 3*

Referring to Figure 2 of the drawing, which is like Figure 1 through the filter 43b, but the solid or slurry is passed via line 46' to tower 12, which may be a baffled tower having about 6 or more baffles. The first stage of the dehydration takes place in the upper or middle part of the tower, e.g., on 2 or 3 top or middle zone baffles, and the second stage takes place in the region of the lower baffles. At the same time, the oily phase passed in via line 19 is also freed of water; preferably in the upper part of the tower. A slurry of dehydrated boric acid (e.g., meta) with hydrocarbon is passed via line 20 to separator 65 wherein the slurry is settled. Other separation or concentration means may be used, e.g., centrifugation. Hydrocarbon plus meta boric acid (thickened) slurry is passed via line 51' to the reactor 10. Hydrocarbon (upper part) is passed via line 30' to the boiler 31. If desired, the slurry may be passed directly to boiler 31, and vapor therefrom used to heat the reactor; and the remainder passed to the reactor (connection not shown).

In an alternative method, some or all of the hydrocarbon passed to boiler 31 may be taken from above the slurry feed point in tower 12 and passed via line 66; then line 20 may be joined to line 51, to pass slurry directly to the reactor 10.

The vapor from tower 12 is passed via line 23 to condenser 13 wherein it is condensed, non-condensibles being removed via line 24. The liquid is passed via line 15 to separator 14, and settled. A lower water layer is separated via line 26. The upper (wet) hydrocarbon layer is passed via line 19 to the tower 12 wherein water is vaporized and removed therefrom. Additional vapor heating (not shown) may be provided, if desired. Any convenient heating means may be used in any tower or other unit of the system.

Comparable results to the foregoing are achieved with various modifications thereof including the following.

Instead of a filter, other solid separation means may be used. The liquid in line 64 may be passed to line 19 or line 33 if desired (connection not shown). A lower hydrate of ortho-boric acid is maintained in admixture with the reactants during the oxidation reaction. Preferred lower hydrates are meta boric acid, tetra boric acid, boron oxide, or mixtures thereof.

Suitable dehydration temperatures are broadly 75° to 300° C., desirably 100° to 200° C., and preferably 140° to 180° C. The dehydration process of this invention is carried out continuously.

The dehydration process of this invention is applicable to processes for the oxidation of a wide variety of hydrocarbons. The invention is especially suitable in systems involving the oxidation of $C_4$ to $C_8$ saturated hydrocarbons such as butane, pentane, methyl butane, cyclopentane, cyclohexane, cycloheptane, cyclooctane, methylcyclopentane, methylcyclohexane, and the like.

In view of the foregoing disclosures, variations and modifications thereof will be apparent to one skilled in the art, and it is intended to include within the invention all such variations and modifications except as do not come within the scope of the appended claims.

What is claimed is:

1. The process which comprises filtering solid ortho-boric acid crystals containing free water from an aqueous borate ester hydrolysis mixture, admixing said crystals in liquid saturated $C_4$ to $C_8$ hydrocarbon, dehydrating said ortho-boric acid to meta-boric acid at temperatures in the range of 75 to 300° C., the dehydration of said ortho-boric acid being carried out by stripping free water from the dispersion of ortho-boric acid in saturated $C_4$ to $C_8$ hydrocarbon by contact with a gaseous mixture of said saturated $C_4$ to $C_8$ hydrocarbon and water, passing the resulting dispersion to a second stage wherein ortho-boric acid is dehydrated to meta-boric acid by contact with a gaseous mixture of saturated $C_4$ to $C_8$ hydrocarbon and water and a gaseous mixture of said saturated $C_4$ to $C_8$ hydrocarbon and dehydration water is separated, said gaseous mixture from second stage being the said gaseous mixture used to strip free water in said first stage, and passing the resulting dispersion of meta-boric acid in saturated $C_4$ to $C_8$ hydrocarbon as feed to a molecular oxygen oxidation.

2. The method of claim 1 wherein the dehydrating temperature is in the range of 100 to 200° C.

3. The method of claim 1 wherein the dehydrating temperature is in the range of 140 to 180° C.

4. The process which comprises filtering solid ortho-boric acid crystals containing free water from an aqueous borate ester hydrolysis mixture, admixing said crystals in liquid cyclohexane, dehydrating said ortho-boric acid to meta-boric acid at a temperature in the range of 75 to 300° C., the dehydration of said ortho-boric acid being carried out by stripping free water from the dispersion of ortho-boric acid in cyclohexane by contact with a gaseous mixture of cyclohexane and water, passing the resulting dispersion to a second stage wherein ortho-boric acid is dehydrated to meta-boric acid by contact with a gaseous mixture of saturated $C_4$ to $C_8$ hydrocarbon and water and a gaseous mixture of cyclohexane and dehydration water is separated, said gaseous mixture from said second stage being the said gaseous mixture used to strip free water in said first stage, and passing the resulting dispersion of meta-boric acid in cyclohexane as feed to a molecular oxygen oxidation.

References Cited by the Examiner

UNITED STATES PATENTS

| | | | |
|---|---|---|---|
| 1,947,989 | 2/1934 | Hellthaler | 260—631 |
| 2,223,494 | 12/1940 | Loder | 260—586 |
| 2,721,180 | 10/1955 | Lawrence | 260—631 |
| 3,076,795 | 2/1963 | Hall | 260—94.7 |
| 3,093,686 | 6/1963 | Simon et al. | 260—586 |

OTHER REFERENCES

Bashkirov et al.: World Petroleum Congress, 5th Proceedings, New York, 1959, vol. 4, pp. 175–83 (publ. 1960).

McGraw-Hill Encyclopedia of Science & Technology, vol. 4, pp. 284–5 (1960).

Sneed et al.: General Inorganic Chemistry, page 729 (1942).

LEON ZITVER, *Primary Examiner.*

D. P. CLARKE, T. G. DILLAHUNTY,
*Assistant Examiners.*